(12) United States Patent
Abouelwafa

(10) Patent No.: US 7,694,079 B2
(45) Date of Patent: Apr. 6, 2010

(54) TAGGED SEQUENTIAL READ OPERATIONS

(75) Inventor: Ayman Abouelwafa, Roseville, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 445 days.

(21) Appl. No.: 11/732,621

(22) Filed: Apr. 4, 2007

(65) Prior Publication Data

US 2008/0250209 A1    Oct. 9, 2008

(51) Int. Cl.
*G06F 12/00* (2006.01)
(52) U.S. Cl. ................................. 711/137; 711/114
(58) Field of Classification Search ................. 711/137, 711/114
See application file for complete search history.

(56) References Cited

U.S. PATENT DOCUMENTS

| | | | |
|---|---|---|---|
| 5,923,876 A | 7/1999 | Teague | |
| 6,161,192 A | 12/2000 | Lubbers | |
| 6,170,063 B1 | 1/2001 | Golding | |
| 6,295,578 B1 | 9/2001 | Dimitroff | |
| 6,397,293 B2 | 5/2002 | Shrader | |
| 6,487,636 B1 | 11/2002 | Dolphin | |
| 6,490,122 B1 | 12/2002 | Holmquist et al. | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliott | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |
| 6,725,393 B1 | 4/2004 | Pellegrino | |
| 6,742,020 B1 | 5/2004 | Dimitroff | |
| 6,745,207 B2 | 6/2004 | Reuter | |
| 6,763,409 B1 | 7/2004 | Elliott | |
| 6,772,231 B2 | 8/2004 | Reuter | |
| 6,775,790 B2 | 8/2004 | Reuter | |
| 6,795,904 B1 | 9/2004 | Kamvysselis | |
| 6,802,023 B2 | 10/2004 | Oldfield | |
| 6,807,605 B2 | 10/2004 | Umberger | |
| 6,817,522 B2 | 11/2004 | Brignone | |
| 6,823,453 B1 | 11/2004 | Hagerman | |
| 6,839,824 B2 | 1/2005 | Camble | |
| 6,842,833 B1 | 1/2005 | Phillips | |

(Continued)

*Primary Examiner*—Christian P Chace
*Assistant Examiner*—Hashem Farrokh

(57) ABSTRACT

In some embodiments, a storage device, comprises a processor, a memory module communicatively connected to the processor, and logic instructions in the memory module which, when executed by the processor, configure the processor to receive a read input/output operation, and configure a prefetch disk data into cache memory in response to a prefetch tag embedded in the read input/output operation.

20 Claims, 5 Drawing Sheets

U.S. PATENT DOCUMENTS

| | | |
|---|---|---|
| 6,845,403 B2 | 1/2005 | Chadalapaka |
| 6,963,954 B1 * | 11/2005 | Trehus et al. ................ 711/137 |
| 7,266,538 B1 * | 9/2007 | Shatil ............................ 707/1 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0168034 A1 | 8/2004 | Homma et al. |
| 2004/0215602 A1 | 10/2004 | Cioccarelli |
| 2004/0230859 A1 | 11/2004 | Cochran |
| 2004/0267959 A1 | 12/2004 | Cochran |
| 2005/0228955 A1 * | 10/2005 | Day et al. .................... 711/137 |
| 2005/0240649 A1 | 10/2005 | Elkington |
| 2006/0106759 A1 * | 5/2006 | Nemoto et al. .................. 707/2 |
| 2006/0224784 A1 * | 10/2006 | Nishimoto et al. ............ 710/36 |
| 2007/0214325 A1 * | 9/2007 | Sasamoto ................... 711/137 |

* cited by examiner

TAGGED SEQUENTIAL READ OPERATIONS

BACKGROUND

Various techniques such as e.g., multi-path software, and load balancing techniques have been introduced to speed up the communication of data between host computers and storage systems. These techniques are intended to increase input/output (I/O), and tend to achieve high success rates for write I/O operations and for random read I/O operations. However, these techniques are inefficient for sequential read I/O operations, especially when multi-path software is coupled with load balancing. This is, at least in part, because a storage controller lacks the capability to detect a sequential read pattern while burdened by the associated overhead incurred by the storage array's attempt to unveil the sequential patterns.

One performance factor in designing a storage array is the array's response time. Designers of storage arrays strive to maintain a low response time, even while I/O load patterns are changing. Almost all storage arrays incorporate algorithms to recognize a sequential read burst as they are issued to the array, hence the array will attempt to pre-fetch the data to be read into the storage array's cache.

Contemporary midrange and enterprise storage offers access to storage capacity managed by a storage controller through multiple array ports. When hosts take advantage of this feature the storage array may have difficulty identifying the sequential read pattern(s). Therefore sequential read I/O detection can be impaired, and the array often fails to recognize the patterns. This results in losing valuable pre-fetching cycles significantly increased response times, higher than normal array processor utilization, and reduced sequential I/O performance.

DETAILED DESCRIPTION

Described herein are exemplary storage network architectures, data architectures, and methods to implement tagged sequential read operations in storage devices. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Exemplary Network Architectures

The subject matter described herein may be implemented in a storage architecture that provides virtualized data storage at a system level, such that virtualization is implemented within a SAN. In the implementations described herein, the computing systems that utilize storage are referred to as hosts. In a typical implementation, a host is any computing system that consumes data storage resources capacity on its own behalf, or on behalf of systems coupled to the host. For example, a host may be a supercomputer processing large databases, a transaction processing server maintaining transaction records, and the like. Alternatively, the host may be a file server on a local area network (LAN) or wide area network (WAN) that provides storage services for an enterprise.

In a direct-attached storage solution, such a host may include one or more disk controllers or RAID controllers configured to manage multiple directly attached disk drives. By contrast, in a SAN a host connects to the SAN in accordance via a high-speed connection technology such as, e.g., a fibre channel (FC) fabric in the particular examples.

A virtualized SAN architecture comprises a group of storage cells, where each storage cell comprises a pool of storage devices called a disk group. Each storage cell comprises parallel storage controllers coupled to the disk group. The storage controllers coupled to the storage devices using a fibre channel arbitrated loop connection, or through a network such as a fibre channel fabric or the like. The storage controllers may also be coupled to each other through point-to-point connections to enable them to cooperatively manage the presentation of storage capacity to computers using the storage capacity.

The network architectures described herein represent a distributed computing environment such as an enterprise computing system using a private SAN. However, the network architectures may be readily scaled upwardly or downwardly to meet the needs of a particular application.

Figure 1:
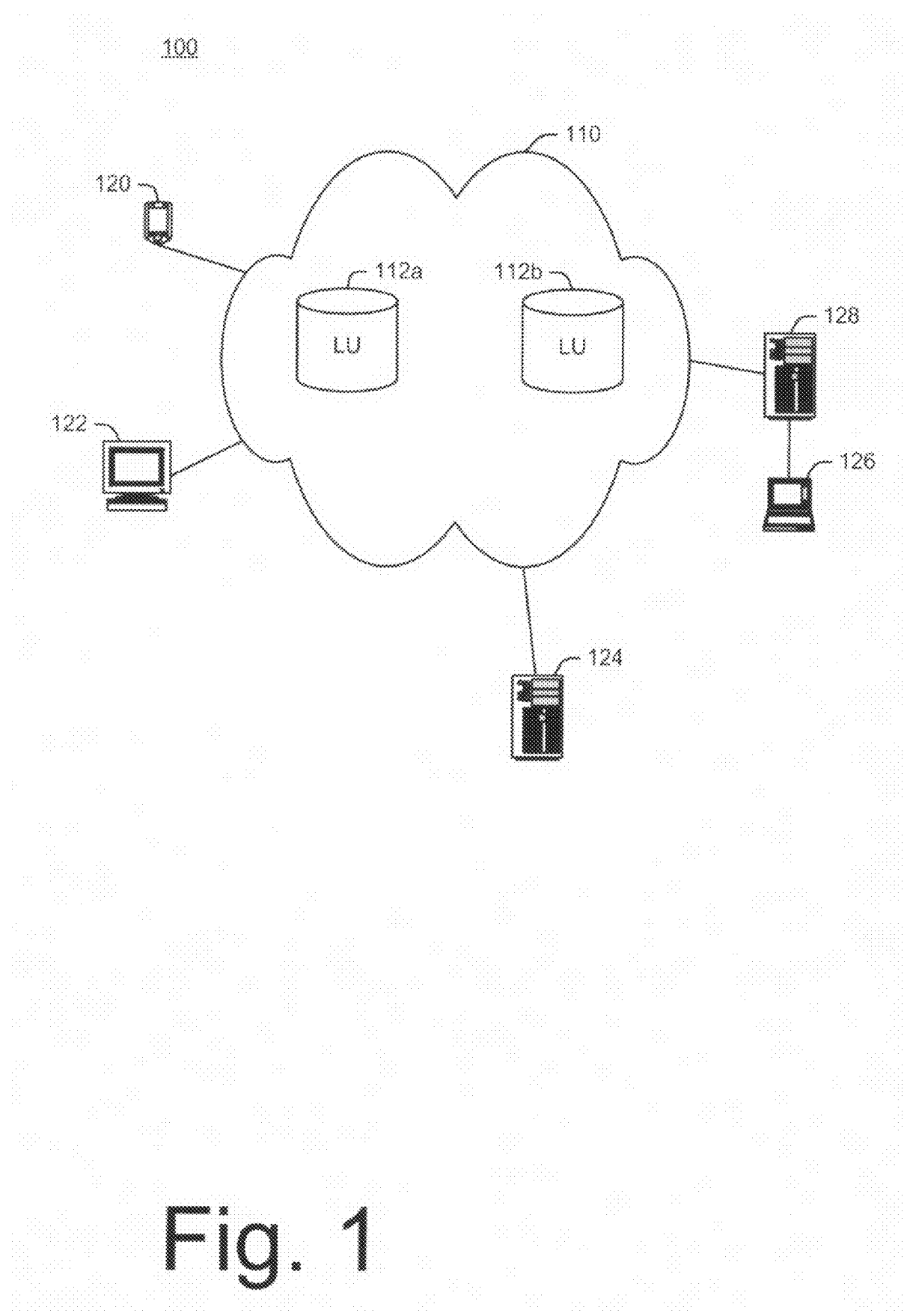
FIG. 1 is a schematic illustration of a networked computing system that utilizes a storage network according to an embodiment.

FIG. 1 is a schematic illustration of an exemplary implementation of a networked computing system 100 that utilizes a storage network. The storage network comprises a storage pool 110, which comprises an arbitrarily large quantity of storage space. In practice, a storage pool 110 has a finite size limit determined by the particular hardware used to implement the storage pool 110. However, there are few theoretical limits to the storage space available in a storage pool 110.

A plurality of logical disks (also called logical units or LUs) 112a, 112b may be allocated within storage pool 110. Each LU 112a, 112b comprises a contiguous range of logical addresses that can be addressed by host devices 120, 122, 124 and 128 by mapping requests from the connection protocol used by the host device to the uniquely identified LU 112. As used herein, the term "host" comprises a computing system(s) that utilize storage on its own behalf, or on behalf of systems coupled to the host. For example, a host may be a supercomputer processing large databases or a transaction processing server maintaining transaction records. Alternatively, a host may be a file server on a local area network (LAN) or wide area network (WAN) that provides storage services for an enterprise. A file server may comprise one or more disk controllers and/or RAID controllers configured to manage multiple disk drives. A host connects to a storage network via a communication connection such as, e.g., a Fibre Channel (FC) connection.

A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which are also hosts, may logically couple directly to LUs 112a, 112b. Hosts 120-128 may couple to multiple LUs 112a, 112b, and LUs 112a, 112b may be shared among multiple hosts. Each of the devices shown in FIG. 1 may include memory, mass storage, and a degree of data processing capability sufficient to manage a network connection.

Figure 2:
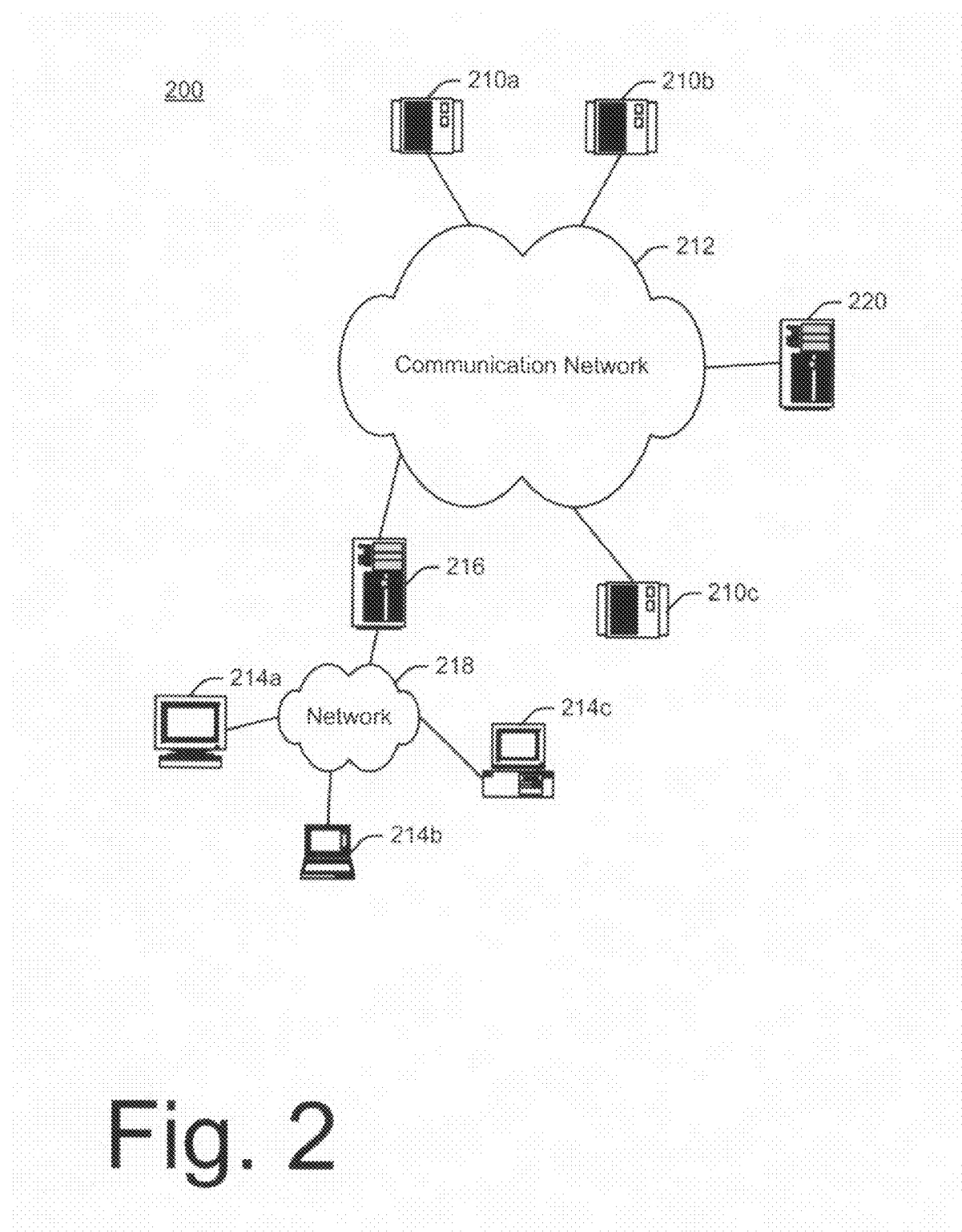
FIG. 2 is a schematic illustration of a storage network according to an embodiment.

FIG. 2 is a schematic illustration of an exemplary storage network 200 that may be used to implement a storage pool such as storage pool 110. Storage network 200 comprises a plurality of storage cells 210a, 210b, 210c connected by a communication network 212. Storage cells 210a, 210b, 210c may be implemented as one or more communicatively connected storage devices. Exemplary storage devices include the STORAGEWORKS line of storage devices commercially available from Hewlett-Packard Corporation of Palo Alto, Calif., USA. Communication network 212 may be implemented as a private, dedicated network such as, e.g., a Fibre Channel (FC) switching fabric. Alternatively, portions of communication network 212 may be implemented using public communication networks pursuant to a suitable communication protocol such as, e.g., the Internet Small Computer Serial Interface (iSCSI) protocol.

Client computers 214a, 214b, 214c may access storage cells 210a, 210b, 210c through a host, such as servers 216, 220, 230. Clients 214a, 214b, 214c may be connected to file server 216 directly, or via a network 218 such as a Local Area Network (LAN) or a Wide Area Network (WAN). The number of storage cells 210a, 210b, 210c that can be included in any storage network is limited primarily by the connectivity implemented in the communication network 212. A switching fabric comprising a single FC switch can interconnect 256 or more ports, providing a possibility of hundreds of storage cells 210a, 210b, 210c in a single storage network.

Figure 3:
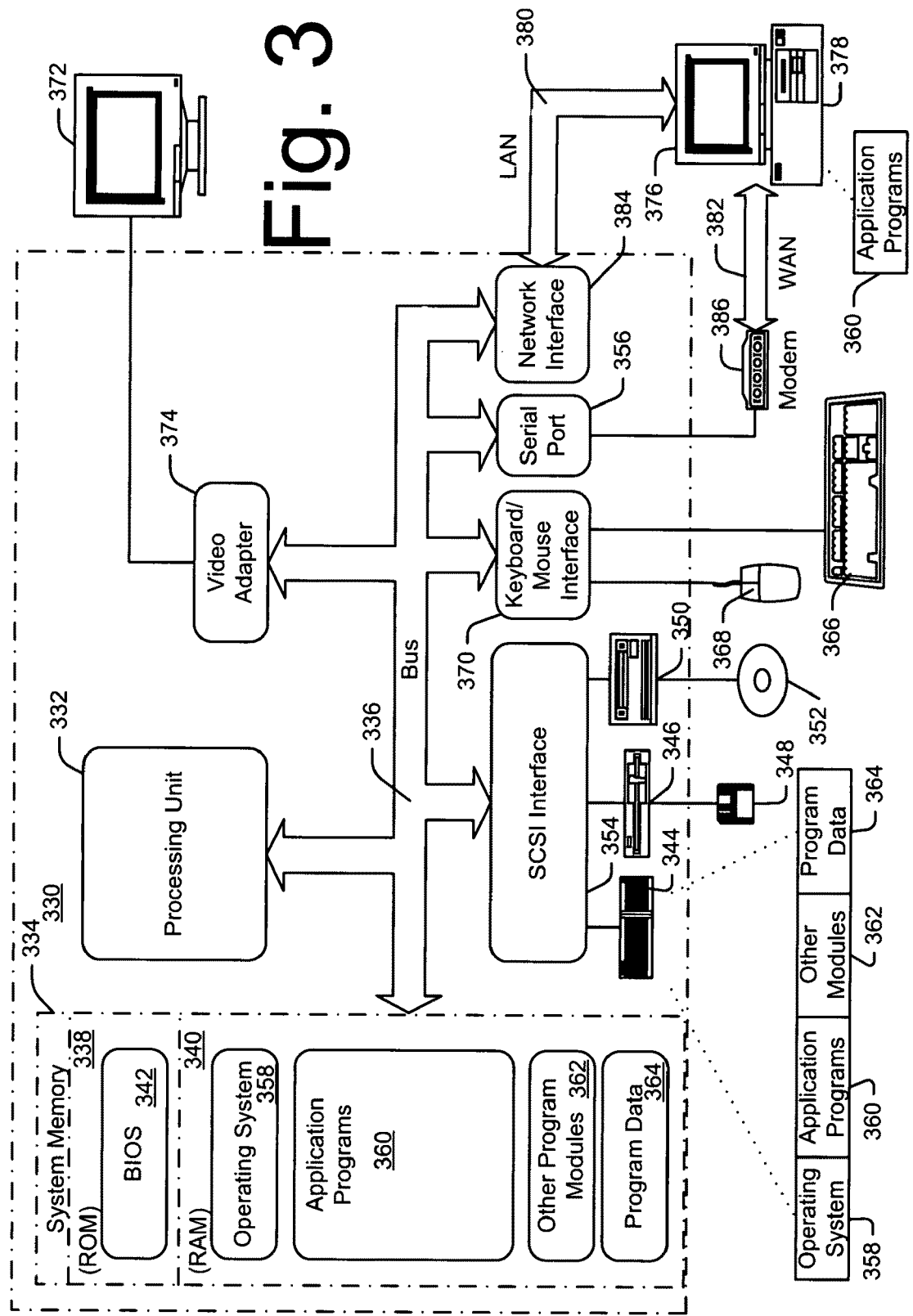
FIG. 3 is a schematic illustration of a computing device that can be utilized to implement a host according to an embodiment.

Hundreds or even thousands of host computers 216, 220 may connect to storage network 200 to access data stored in storage cells 210a, 210b, 210c. Hosts 216, 220 may be embodied as server computers. FIG. 3 is a schematic illustration of an exemplary computing device 330 that can be utilized to implement a host. Computing device 330 includes one or more processors or processing units 332, a system memory 334, and a bus 336 that couples various system components including the system memory 334 to processors 332. The bus 336 represents one or more of any of several types of bus structures, including a memory bus or memory controller, a peripheral bus, an accelerated graphics port, and a processor or local bus using any of a variety of bus architectures. The system memory 334 includes read only memory (ROM) 338 and random access memory (RAM) 340. A basic input/output system (BIOS) 342, containing the basic routines that help to transfer information between elements within computing device 330, such as during start-up, is stored in ROM 338.

Computing device 330 further includes a hard disk drive 344 for reading from and writing to a hard disk (not shown), and may include a magnetic disk drive 346 for reading from and writing to a removable magnetic disk 348, and an optical disk drive 350 for reading from or writing to a removable optical disk 352 such as a CD ROM or other optical media. The hard disk drive 344, magnetic disk drive 346, and optical disk drive 350 are connected to the bus 336 by a SCSI interface 354 or some other appropriate interface. The drives and their associated computer-readable media provide nonvolatile storage of computer-readable instructions, data structures, program modules and other data for computing device 330. Although the exemplary environment described herein employs a hard disk, a removable magnetic disk 348 and a removable optical disk 352, other types of computer-readable media such as magnetic cassettes, flash memory cards, digital video disks, random access memories (RAMs), read only memories (ROMs), and the like, may also be used in the exemplary operating environment.

A number of program modules may be stored on the hard disk 344, magnetic disk 348, optical disk 352, ROM 338, or RAM 340, including an operating system 358, one or more application programs 360, other program modules 362, and program data 364. A user may enter commands and information into computing device 330 through input devices such as a keyboard 366 and a pointing device 368. Other input devices (not shown) may include a microphone, joystick, game pad, satellite dish, scanner, or the like. These and other input devices are connected to the processing unit 332 through an interface 370 that is coupled to the bus 336. A monitor 372 or other type of display device is also connected to the bus 336 via an interface, such as a video adapter 374.

Computing device 330 may operate in a networked environment using logical connections to one or more remote computers, such as a remote computer 376. The remote computer 376 may be a personal computer, a server, a router, a network PC, a peer device or other common network node, and typically includes many or all of the elements described above relative to computing device 330, although only a memory storage device 378 has been illustrated in FIG. 3. The logical connections depicted in FIG. 3 include a LAN 380 and a WAN 382.

When used in a LAN networking environment, computing device 330 is connected to the local network 380 through a network interface or adapter 384. When used in a WAN networking environment, computing device 330 typically includes a modem 386 or other means for establishing communications over the wide area network 382, such as the Internet. The modem 386, which may be internal or external, is connected to the bus 336 via a serial port interface 356. In a networked environment, program modules depicted relative to the computing device 330, or portions thereof, may be stored in the remote memory storage device. It will be appreciated that the network connections shown are exemplary and other means of establishing a communications link between the computers may be used.

Hosts 216, 220 may include host adapter hardware and software to enable a connection to communication network 212. The connection to communication network 212 may be through an optical coupling or more conventional conductive cabling depending on the bandwidth requirements. A host adapter may be implemented as a plug-in card on computing device 330. Hosts 216, 220 may implement any number of host adapters to provide as many connections to communication network 212 as the hardware and software support.

Generally, the data processors of computing device 330 are programmed by means of instructions stored at different times in the various computer-readable storage media of the computer. Programs and operating systems distributed, for example, on floppy disks, CD-ROMs, or electronically, and are installed or loaded into the secondary memory of a computer. At execution, the programs are loaded at least partially into the computer's primary electronic memory.

Figure 4:
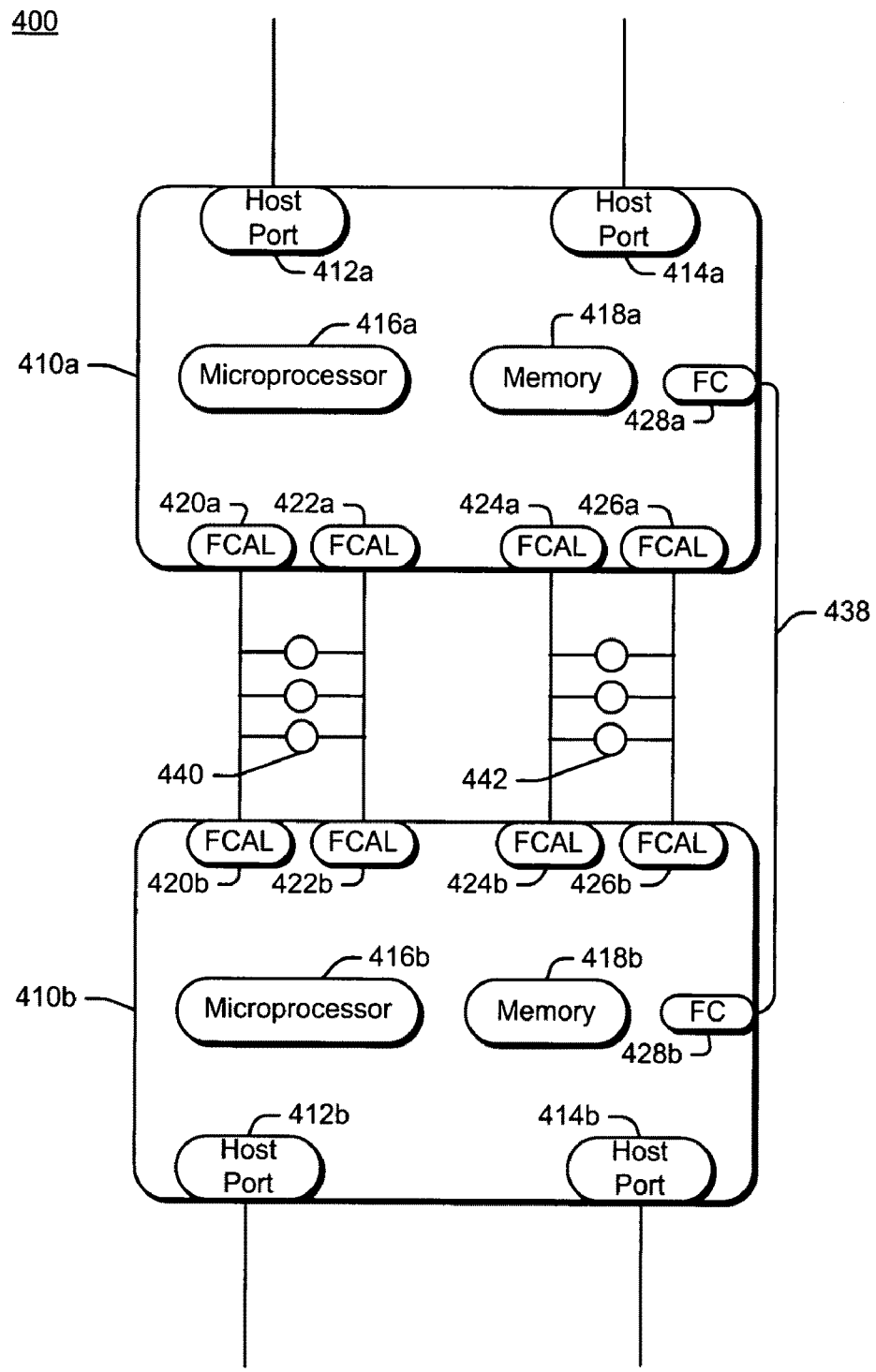
FIG. 4 is a schematic illustration of a storage cell according to an embodiment.

FIG. 4 is a schematic illustration of an exemplary implementation of a storage cell 400, such as storage cell 210. Referring to FIG. 4, storage cell 400 includes two Network Storage Controllers (NSCs), also referred to as disk controllers, 410a, 410b to manage the operations and the transfer of data to and from one or more disk arrays 440, 442. NSCs 410a, 410b may be implemented as plug-in cards having a microprocessor 416a, 416b, and memory 418a, 418b. Each NSC 410a, 410b includes dual host adapter ports 412a, 414a, 412b, 414b that provide an interface to a host, i.e., through a communication network such as a switching fabric. In a Fibre Channel implementation, host adapter ports 412a, 412b, 414a, 414b may be implemented as FC N_Ports. Each host adapter port 412a, 412b, 414a, 414b manages the login and interface with a switching fabric, and is assigned a fabric-unique port ID in the login process. The architecture illustrated in FIG. 4 provides a fully-redundant storage cell; only a single NSC is required to implement a storage cell 210.

Each NSC 410a, 410b further includes a communication port 428a, 428b that enables a communication connection 438 between the NSCs 410a, 410b. The communication connection 438 may be implemented as a FC point-to-point connection, or pursuant to any other suitable communication protocol.

In an exemplary implementation, NSCs 410a, 410b further include a plurality of Fiber Channel Arbitrated Loop (FCAL) ports 420a-426a, 420b-426b that implement an FCAL communication connection with a plurality of storage devices, e.g., arrays of disk drives 440, 442. While the illustrated embodiment implement FCAL connections with the arrays of disk drives 440, 442, it will be understood that the communication connection with arrays of disk drives 440, 442 may be implemented using other communication protocols. For example, rather than an FCAL configuration, a FC switching fabric may be used.

Exemplary Operations

Figure 5:
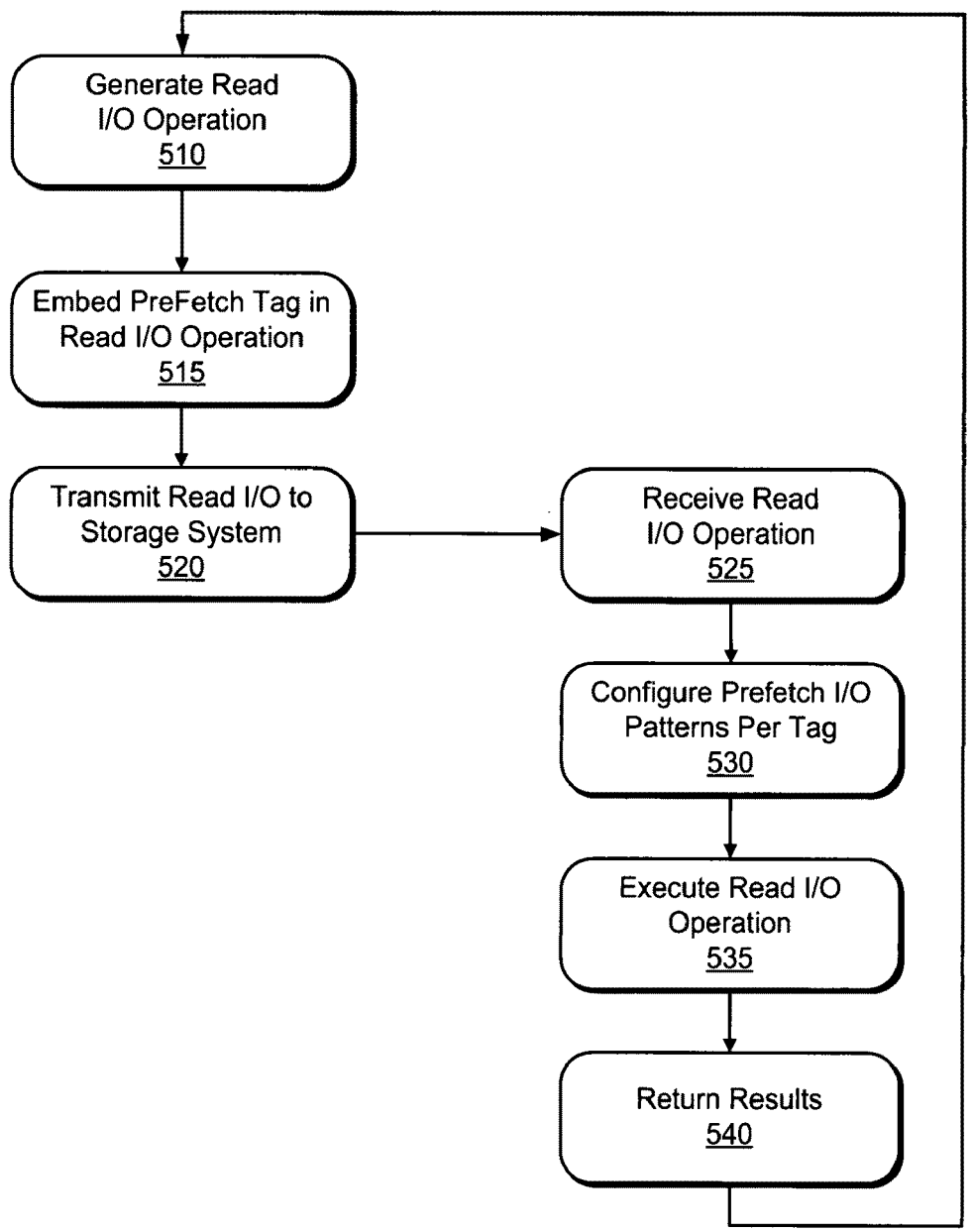
FIG. 5 is a flowchart illustrating operations in an exemplary method to implement tagged sequential read operations.

FIG. 5 is a flowchart illustrating operations in an exemplary method to implement tagged sequential read operations. In the following description, it will be understood that each block of the flowchart illustrations, and combinations of blocks in the flowchart illustrations, can be implemented by computer program instructions. These computer program instructions may be loaded onto a computer or other programmable apparatus to produce a machine, such that the instructions that execute on a processor or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Referring to FIG. 5, at operation 510 a read operation is generated. For example, a host computer such as host computer 128 may generate a read I/O operation for data in a LUN stored in a storage system.

At operation 515 a prefetch tag is embedded into the read input/output operation. In one embodiment the prefetch tag may be embodied as a two-bit tag which indicates the requested I/O pattern. For example, a prefetch tag of value "00" indicates a random read I/O operation. In this case the array does not need to pre-fetch data from the disk(s) into a cache memory. A prefetch tag of value "11" indicates a massive sequential read pattern which may be used, e.g., to fulfill a typical read for a backup process or disk mirroring operation. In response to a "11" prefetch tag, the storage controller may prefetch many blocks ahead of the current read as the process will immediately target the pre-fetched data. A prefetch tag of value "01" indicates the need for only one more read I/O to be pre-fetched. A prefetch value of "10" indicates more than two read I/Os but less than a massive transfer indicated by a "11" value. The specific upper threshold of a "10" prefetch tag may vary; in one embodiment the threshold may be specified as eight (8) sequential read I/O operations or more than eight based on the array design and architecture and hardware capabilities. These prefetch tags are summarized in Table 1, below.

TABLE I

| Tag | Tag Flag | Potential Implementation |
| --- | --- | --- |
| 00 | Random Read I/O | Treat Read I/O as random, no Pre-fetching required |
| 01 | Sequential Type (A) | Treat Read I/O as short sequential (Pre-fetch only next I/O) can be used to fetch current and only one more I/O |
| 10 | Sequential Type (B) | Treat Read I/O as large sequential (More than 2 and less than 8 I/Os to be perfected). The storage array will best tune to the number of I/Os between 2 and 8 to be pre-fetched based on its design and capabilities |
| 11 | Sequential Type (X) Massive Sequential Read | Treat Read I/O as Massive sequential suitable for backup, Host Mirror . . . etc. (More than 8 I/Os to be pre-fetched). The storage array will respond to the nature of this I/O pattern as it's greater than 8 I/Os and repeats the behavior over long periods of time. Each array's behavior with respect to the number of pre-fetched I/Os will depend upon on the array's design and capabilities |

In some embodiments the prefetch tag may be embedded into a data block in a SCSI Read command. For example, as shown in Table II, the prefetch tag may be embedded into byte 6 of the SCSI Read (10), or in byte 10 of the SCSI Read (12), Read (16) and Read (32) command. Other data blocks may be used.

TABLE II

| | The Read(10) command | | | | | | |
| --- | --- | --- | --- | --- | --- | --- | --- |
| | bit→ | | | | | | |
| ↓byte | 7 | 6 | 5 | 4 | 3 | 2 | 1 | 0 |
| 0 | Operation code = 28h | | | | | | | |
| 1 | | LUN | | DPO | FUA | Reserved | | RelAdr |
| 2-5 | LBA | | | | | | | |
| 6 | Reserved | | | | | | | |
| 7-8 | Transfer length | | | | | | | |
| 9 | Control | | | | | | | |

TABLE II-continued

Read(10) command

| ↓byte | bit→ 7 | 6 | 5 | 4 | 3 | 2 | 1 | 0 |
|---|---|---|---|---|---|---|---|---|
| 0 | | | Operation code = 28h | | | | | |
| 1 | LUN | | | DPO | FUA | Reserved | | RelAdr |
| 2-5 | LBA | | | | | | | |
| 6 | Reserved | | | | | | Read TAG | |
| 7-8 | Transfer length | | | | | | | |
| 9 | Control | | | | | | | |

The Read(12) command

| ↓byte | bit→ 7 | 6 | 5 | 4 | 3 | 2 | 1 | 0 |
|---|---|---|---|---|---|---|---|---|
| 0 | | | Operation code = A8h | | | | | |
| 1 | Reserved | | | DPO | FUA | Reserved | | RelAdr |
| 2-5 | LBA | | | | | | | |
| 6-9 | Transfer length | | | | | | | |
| 10 | Reserved | | | | | | | |
| 11 | Control | | | | | | | |
| | Current | | | | | | | |

Read(12) command

| ↓byte | bit→ 7 | 6 | 5 | 4 | 3 | 2 | 1 | 0 |
|---|---|---|---|---|---|---|---|---|
| 0 | | | Operation code = A8h | | | | | |
| 1 | Reserved | | | DPO | FUA | Reserved | | RelAdr |
| 2-5 | LBA | | | | | | | |
| 6-9 | Transfer length | | | | | | | |
| 10 | Reserved | | | | | | Read TAG | |
| 11 | Control | | | | | | | |
| | Proposed Read Tag | | | | | | | |

In another embodiment the prefetch tag may be embedded in a reserved data block in a fibre channel frame. For example, the FCP_CMND IU carries either a SCSI Command or a task management request. Table III illustrates embedding the prefetch tag into two bits (3 & 4) of reserved byte 9.

TABLE III

FCP_CMND IU Payload

| Byte | Bit 7 | 6 | 5 | 4 | 3 | 2 | 1 | 0 |
|---|---|---|---|---|---|---|---|---|
| 0 | FCP_LUN | | | | | | | |
| 7 | | | | | | | | |
| 8 | COMMAND REFERENCE NUMBER | | | | | | | |
| 9 | Reserved | | | | | | TASK ATTRIBUTE | |
| 10 | TASK MANAGEMENT FLAGS | | | | | | | |
| 11 | ADDITIONAL FCP_CDB LENGTH = (N-27)/4 | | | | | RODATA | WRDATA | |
| 12 | FCP_CDB | | | | | | | |
| 27 | | | | | | | | |
| 28 | ADDITIONAL FCP_CDB (if any) | | | | | | | |
| n | | | | | | | | |
| n + 1 | (MSB) | | | | | | | |
| n + 2 | FCP_DL | | | | | | | |
| n + 3 | | | | | | | | |
| n + 4 | | | | | | | | (LSB) |
| n + 5 | (MSB) | | | | | | | |
| n + 6 | FCP_BIDIRECTIONAL_READ_DL (if any) | | | | | | | |
| n + 7 | | | | | | | | |
| n + 8 | | | | | | | | (LSB) |

FCP_CMND IU Payload

| Byte | Bit 7 | 6 | 5 | 4 | 3 | 2 | 1 | 0 |
|---|---|---|---|---|---|---|---|---|
| 0 | FCP_LUN | | | | | | | |
| 7 | | | | | | | | |
| 8 | COMMAND REFERENCE NUMBER | | | | | | | |
| 9 | Reserved | | | | Read TAG | | TASK ATTRIBUTE | |
| 10 | TASK MANAGEMENT FLAGS | | | | | | | |
| 11 | ADDITIONAL FCP_CDB LENGTH = (N-27)/4 | | | | | RODATA | WRDATA | |
| 12 | FCP_CDB | | | | | | | |
| 27 | | | | | | | | |
| 28 | ADDITIONAL FCP_CDB (if any) | | | | | | | |
| n | | | | | | | | |
| n + 1 | (MSB) | | | | | | | |
| n + 2 | FCP_DL | | | | | | | |
| n + 3 | | | | | | | | |
| n + 4 | | | | | | | | (LSB) |
| n + 5 | (MSB) | | | | | | | |
| n + 6 | FCP_BIDIRECTIONAL_READ_DL (if any) | | | | | | | |
| n + 7 | | | | | | | | |
| n + 8 | | | | | | | | (LSB) |

At operation 520 the read I/O operation is transmitted from the host computer to a storage controller such as, e.g., the storage controller 400 depicted in FIG. 4. For example, the I/O operation may be transmitted via either single path or multi-path and with or without load balancing software. At operation 525 the read I/O operation is received in the storage controller and, at operation 530, the storage controller configures the prefetch patterns in response to the value of the prefetch tag, e.g., as described above. For example, the storage controller may allocate and configure its cache memory according to the prefetch tag to immediately accommodate for the prefetch tag pattern. At operation 530 the read I/O operation is executed and at operation 535 the results are returned to the host computer that generated the read I/O request.

Thus, the operations depicted in FIG. 5 permit a storage controller to configure prefetch cache according to the value of the prefetch tag embedded in the read I/O operation. This enhances the efficiency and the speed of storage controller, particularly when responding to sequential read I/O operations.

Although the described arrangements and procedures have been described in language specific to structural features and/or methodological operations, it is to be understood that the subject matter defined in the appended claims is not necessarily limited to the specific features or operations described. Rather, the specific features and operations are disclosed as preferred forms of implementing the claimed present subject matter.

What is claimed is:
1. A method of computing, comprising:
  receiving a read input/output operation; and
  configuring a prefetch data into cache in response to a prefetch tag embedded in the read input/output opera- tion, a sequential read input/output tag being read from a reserved data block in a SCSI read command.

2. The method of claim 1, wherein configuring a prefetch data into cache in response to a prefetch tag embedded in the read input/output operation comprises prefetching sufficient data for one additional read operation.

3. The method of claim 1, wherein configuring a prefetch cache in response to a prefetch tag embedded in the read input/output operation comprises prefetching sufficient data for between two and eight additional read operations.

4. The method of claim 1, wherein configuring a prefetch data into cache in response to a prefetch tag embedded in the read input/output operation comprises prefetching sufficient data for more than eight additional read operations.

5. The method of claim 1, further comprising:
executing the read input/output operation; and
returning a result of the read input/output operation to a host computer.

6. A method of computing, comprising:
receiving a read input/output operation; and
configuring a prefetch data into cache in response to a prefetch tag embedded in the read input/output operation, a sequential read input/output tag bring read from a reserved data block in a fibre channel frame.

7. The method of claim 6, wherein configuring a prefetch data into cache in response to a prefetch tag embedded in the read input/output operation comprises prefetching sufficient data for one additional read operation.

8. A storage device, comprising:
a processor;
a memory module communicatively connected to the processor;
logic instructions in the memory module which, when executed by the processor, configure the processor to:
receive a read input/output operation; and
configure a prefetch cache in response to a prefetch tag embedded in the read input/output operation, a sequential read input/output tag being read from a reserved data block in a SCSI read command.

9. The storage device of claim 8, further comprising logic instructions in the memory module which, when executed by the processor, configure the processor to prefetch sufficient data for one additional read operation.

10. The storage device of claim 8, further comprising logic instructions in the memory module which, when executed by the processor, configure the processor to prefetch sufficient data for between two and eight additional read operations.

11. The storage device of claim 8, further comprising logic instructions in the memory module which, when executed by the processor, configure the processor to prefetch sufficient data for more than eight additional read operations.

12. The storage device of claim 8, further comprising logic instructions in the memory module which, when executed by the processor, configure the processor to:
execute the read input/output operation; and
return a result of the read input/output operation to a host computer.

13. A storage device, comprising:
a processor;
a memory module communicatively connected to the processor;
logic instructions in the memory module which, when executed by the processor, configure the processor to:
receive a read input/output operation; and
configure a prefetch cache in response to a prefetch tag embedded in the read input/output operation, a sequential read input/output tag being read from a reserved data block in a fibre channel frame.

14. The storage device of claim 13, further comprising logic instructions in the memory module which, when executed by the processor, configure the processor to prefetch sufficient data for one additional read operation.

15. A method, comprising:
generating a read input/output operation in a host computer;
associating a prefetch tag with the read input/output operation;
transmitting the read input/output operation to a storage system;
receiving the read input/output operation in a storage controller in the storage system; and
configuring a prefetch data into cache in response to a prefetch tag embedded in the read input/output operation, a sequential read input/output tag being embedded into a reserved data block in a SCSI read command.

16. The method of claim 15, wherein configuring a prefetch cache in response to a prefetch tag embedded in the read input/output operation comprises prefetching sufficient data for one additional read operation.

17. The method of claim 15, wherein configuring a prefetch cache in response to a prefetch tag embedded in the read input/output operation comprises prefetching sufficient data for between two and eight additional read operations.

18. The method of claim 15, wherein configuring a prefetch cache in response to a prefetch tag embedded in the read input/output operation comprises prefetching sufficient data for more than eight additional read operations.

19. A method, comprising:
generating a read input/output operation in a host computer;
associating a prefetch tag with the read input/output operation;
transmitting the read input/output operation to a storage system;
receiving the read input/output operation in a storage controller in the storage system; and
configuring a prefetch data into cache in response to a prefetch tag embedded in the read input/output operation, a sequential read input/output tag being read from a reserved data block in a fibre channel frame.

20. The method of claim 19, wherein configuring a prefetch cache in response to a prefetch tag embedded in the read input/output operation comprises prefetching sufficient data for one additional read operation.

* * * * *